United States Patent
Biernath et al.

(10) Patent No.: US 7,843,637 B2
(45) Date of Patent: Nov. 30, 2010

(54) BIREFRINGENT STRUCTURED FILM FOR LED COLOR MIXING IN A BACKLIGHT

(75) Inventors: Rolf W. Biernath, Wyoming, MN (US); William W. Merrill, White Bear Lake, MN (US); Robert L. Brott, Woodbury, MN (US); David A. Kowitz, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1196 days.

(21) Appl. No.: 11/425,761

(22) Filed: Jun. 22, 2006

(65) Prior Publication Data

US 2007/0297747 A1    Dec. 27, 2007

(51) Int. Cl.
*G02B 5/30*    (2006.01)

(52) U.S. Cl. ...................... 359/495; 359/615

(58) Field of Classification Search ............ None
See application file for complete search history.

(56) References Cited

U.S. PATENT DOCUMENTS

| | | | |
|---|---|---|---|
| 3,213,753 A * | 10/1965 | Rogers | 359/497 |
| 4,737,559 A | 4/1988 | Kellen et al. | |
| 5,057,366 A | 10/1991 | Husman et al. | |
| 5,771,328 A | 6/1998 | Wortman et al. | |
| 5,905,826 A | 5/1999 | Benson, Jr. et al. | |
| 6,461,003 B1 | 10/2002 | Neudeck | |
| 6,700,695 B2 | 3/2004 | Engler et al. | |
| 6,855,386 B1 | 2/2005 | Daniels et al. | |
| 7,418,202 B2 * | 8/2008 | Biernath et al. | 396/268 |
| 2003/0171051 A1 | 9/2003 | Bergsten et al. | |
| 2003/0231497 A1 * | 12/2003 | Sakata et al. | 362/341 |
| 2006/0138686 A1 * | 6/2006 | Ouderkirk et al. | 264/2.7 |
| 2006/0138693 A1 | 6/2006 | Tuman et al. | |
| 2006/0138694 A1 * | 6/2006 | Biernath et al. | 264/210.2 |
| 2006/0138702 A1 * | 6/2006 | Biernath et al. | 264/288.4 |

(Continued)

FOREIGN PATENT DOCUMENTS

CA    2 497 515    12/1997

(Continued)

OTHER PUBLICATIONS

Emulsion Polymerization and Emulsion Polymers, chapter 13, p. 455 (P. Lovell and M. El-Aasser editors, John Wiley and Sons, NY 1997).

(Continued)

*Primary Examiner*—Arnel C Lavarias
*Assistant Examiner*—Derek S Chapel (57) ABSTRACT

An article for use in light spreading includes a body having first and second surfaces, and first and second in-plane axes that are orthogonal with respect to each other and a third axis that is mutually orthogonal to the first and second in-plane axes in a thickness direction of the body. A portion of the first surface is a birefringent structured surface. The portion is structured such that, when the article receives a light signal within a particular range of wavelengths, the structured surface causes splitting the light signal into a plurality of divergent light signals. The article can be used for color mixing such as in a cavity providing a backlight for LCD devices or other display devices requiring a backlight.

6 Claims, 8 Drawing Sheets

U.S. PATENT DOCUMENTS

| | | | |
|---|---|---|---|
| 2006/0141218 A1* | 6/2006 | Biernath et al. | 428/156 |
| 2006/0141219 A1* | 6/2006 | Benson et al. | 428/156 |
| 2006/0141220 A1* | 6/2006 | Merrill et al. | 428/156 |
| 2006/0204720 A1* | 9/2006 | Biernath et al. | 428/156 |
| 2006/0274244 A1* | 12/2006 | Battiato et al. | 349/119 |
| 2007/0065636 A1* | 3/2007 | Merrill et al. | 428/141 |
| 2009/0067048 A1* | 3/2009 | Battiato et al. | 359/494 |

FOREIGN PATENT DOCUMENTS

| | | |
|---|---|---|
| CN | 1357868 | 7/2002 |
| CN | 1542516 A | 11/2004 |
| CN | 1181460 C | 12/2004 |
| GB | 2 157 048 | 10/1985 |
| JP | 2003-29674 | 1/2003 |
| JP | 2003-156603 | 5/2003 |

OTHER PUBLICATIONS

Handbook of Pressure-Sensitive Adhesive Technology $2^{nd}$ edition, chapter 15, p. 473 (D. Satas editor, Van Nostrand Reinhold, NY 1989)

* cited by examiner

BIREFRINGENT STRUCTURED FILM FOR LED COLOR MIXING IN A BACKLIGHT

FIELD

The present invention relates to an article having a birefringent surface, and the manufacture of it, for use in light emitting diode (LED) color mixing.

BACKGROUND

Liquid crystal display (LCD) devices require a backlight. The LCD selectively transmits or blocks the light from the backlight to provide for display of information. These LCD devices use a fluorescent tube as the backlight, and the fluorescent bulbs tend to consume a relatively large amount of power. For LCD devices that can operate on battery power, the fluorescent backlights can significantly reduce the operational time of the device on battery power. Instead of using a fluorescent light source, some backlights have point light sources such as LEDs. However, these point light sources emit discrete colors, which means the light from them must be both spatially distributed and mixed in order to generate uniform light.

SUMMARY

An article for use in light spreading, consistent with the present invention, includes a body having first and second surfaces, and first and second in-plane axes that are orthogonal with respect to each other and a third axis that is mutually orthogonal to the first and second in-plane axes in a thickness direction of the body. A portion of the first surface is a birefringent structured surface, and the portion is structured such that, when the article receives a light signal within a particular range of wavelengths, the structured surface causes splitting the light signal into a plurality of divergent light signals.

A method of making an article for use in light spreading, consistent with the present invention, includes the steps of: providing a body having first and second surfaces, and first and second in-plane axes that are orthogonal with respect to each other and a third axis that is mutually orthogonal to the first and second in-plane axes in a thickness direction of the body; and forming a birefringent structured surface on a portion of the first surface, wherein the portion is structured such that, when the article receives a light signal within a particular range of wavelengths, the structured surface causes splitting the light signal into a plurality of divergent light signals.

The geometric feature or features replicated for use in color mixing may be, for example, either a prismatic, lenticular, or sinusoidal geometric feature. The geometric feature or features may be continuous or discontinuous both widthwise and lengthwise. It may be a macro- or a micro-feature. It may have a variety of cross-sectional profiles as discussed more fully below. The geometric feature may be repeating or non-repeating on the replicated structured surface. The replicated surface may comprise a plurality of geometric features that have the same cross-sectional shape. Alternatively, it may have a plurality of geometric features that have different cross-sectional shapes.

As used herein, the following terms and phrases have the following meaning.

"Birefringent surface" means a surface portion of a body proximate a birefringent material in the body.

"Cross sectional shape", and obvious variations thereof, means the configuration of the periphery of the geometric feature defined by the second in-plane axis and the third axis. The cross sectional shape of the geometric feature is independent of is physical dimension.

"Dispersion" means the variation of refractive index with wavelength. Dispersion may vary along different axes differently in an anisotropic material.

"Geometric feature", and obvious variations thereof, means the predetermined shape or shapes present on the structured surface.

"Macro" is used as a prefix and means that the term that it modifies has a cross-sectional profile that has a height of greater than 1 mm.

"Metallic surface" and obvious variations thereof, means a surface coated or formed from a metal or a metal alloy which may also contain a metalloid. "Metal" refers to an element such as iron, gold, aluminum, etc., generally characterized by ductility, malleability, luster, and conductivity of heat and electricity which forms a base with the hydroxyl radical and can replace the hydrogen atom of an acid to form a salt. "Metalloid" refers to nonmetallic elements having some of the properties of a metal and/or forming an alloy with metal (for example, semiconductors) and also includes nonmetallic elements which contain metal and/or metalloid dopants.

"Micro" is used as a prefix and means that the term it modifies has a cross-sectional profile that has a height of 1 mm or less. The cross-sectional profile has a height of 0.5 mm or less. Alternatively, the cross-sectional profile is 0.05 mm or less.

"Orientation" means a state of being oriented.

"Oriented" means having an anisotropic dielectric tensor with a corresponding anisotropic set of refractive indices.

"Stretch ratio", and obvious variations thereof, means the ratio of the distance between two points separated along a direction of stretch after stretching to the distance between the corresponding points prior to stretching.

"Structure surface" means a surface that has at least one geometric feature thereon.

"Structured surface" means a surface that has been created by any technique that imparts a desired geometric feature or plurality of geometric features to a surface.

"Uniaxial orientation" means that two of the principle refractive indices are substantially the same.

"True uniaxial orientation", and obvious variations thereof, means a state of uniaxial orientation in which the orientation sensitive properties measured along the second in-plane axis and the third axis are substantially equal and differ substantially from the orientation sensitive properties along the first in-plane axis.

"Uniaxial stretch", including obvious variations thereof, means the act of grasping opposite edges of an article and physically stretching the article in only one direction. Uniaxial stretch is intended to include slight imperfections in uniform stretching of the film due to, for example, shear effects that can induce momentary or relatively very small biaxial stretching in portions of the film.

In the case of layered films, "uniaxial" or "truly uniaxial" are intended to apply to individual layers of the film unless otherwise specified.

"Wavelength" means the equivalent wavelength measured in a vacuum.

BRIEF DESCRIPTION OF THE DRAWINGS

The invention may be more completely understood in the following detailed description of various embodiments of the invention in connection with the accompanying drawings, in which.

DETAILED DESCRIPTION

Figure 1:
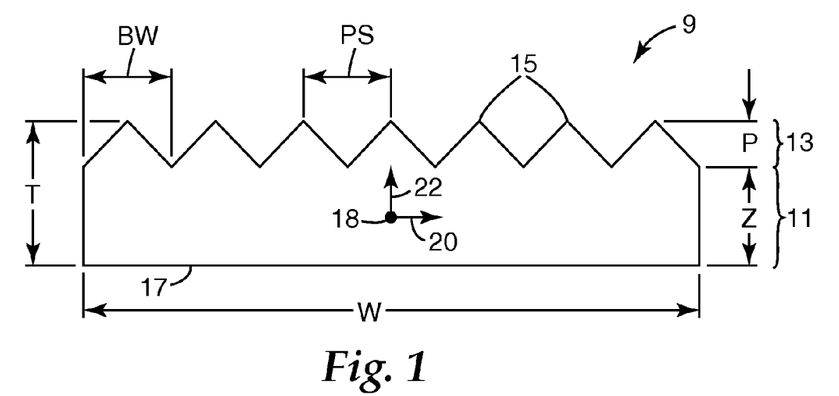
FIG. 1 is a sectional view of a film made by one method.
Figure 2A:
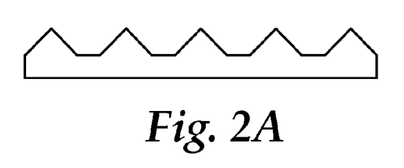
FIGS. 2A-2E are end views of some alternative embodiments of an article.
Figure 2B:
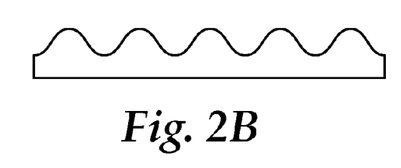
Figure 2C:
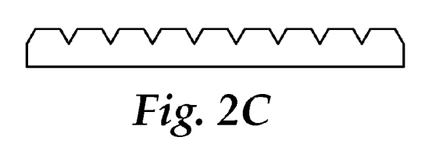
Figure 2D:
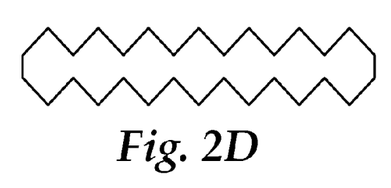
Figure 2E:
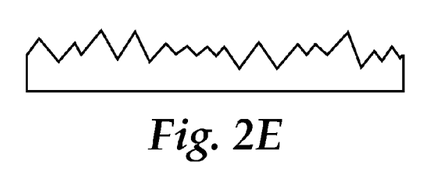
Figure 3A:
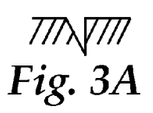
FIGS. 3A-3W illustrate sectional views of some alternative profiles of geometric features that can be made by one method.
Figure 3B:
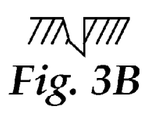
Figure 3C:
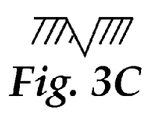
Figure 3D:
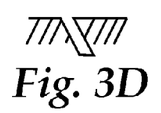
Figure 3E:
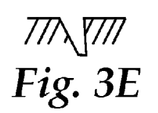
Figure 3F:
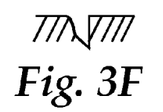
Figure 3G:
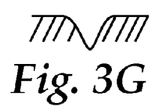
Figure 3H:
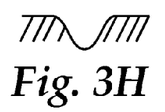
Figure 3I:
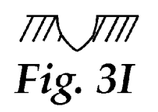
Figure 3J:
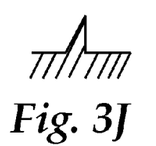
Figure 3K:
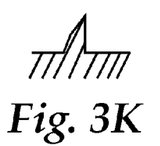
Figure 3L:
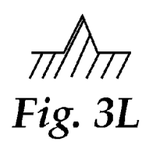
Figure 3M:
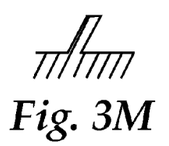
Figure 3N:
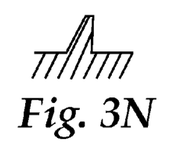
Figure 3O:
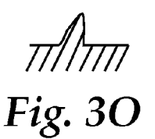
Figure 3P:
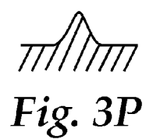
Figure 3Q:
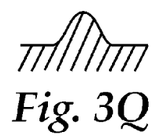
Figure 3R:
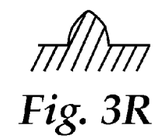
Figure 3S:
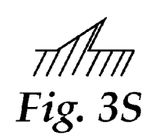
Figure 3T:
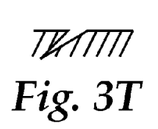
Figure 3U:
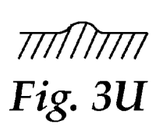
Figure 3V:
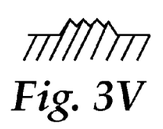
Figure 3W:
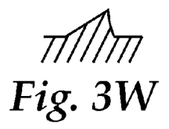

The articles and films made by one exemplary process generally comprise a body portion and a surface structure portion. FIG. 1 represents end views of a film made according to various embodiments. FIGS. 2A-2E illustrate end views of some alternative embodiment films that can be made by one particular process. FIGS. 3A-3W illustrate some alternative embodiments of geometric features of articles having structured surfaces.

Referring to FIG. 1, film 9 comprises a body or land portion 11 having a thickness (Z) and a surface portion 13 having a height (P). Surface portion 13 comprises a series of parallel geometric features 15 here shown as right angle prisms. Geometric features 15 each have a base width (BW) and a peak-to-peak spacing (PS). The film has a total thickness T which is equal to the sum of P+Z.

Body or land portion 11 comprises the portion of the article between bottom surface 17 of the film 9 and the lowest point of the surface portion 13. In some cases, this may be a constant dimension across the width (W) of the article. In other cases, this dimension may vary due to the presence of geometric features having varying peak heights or valley depths. See FIG. 2E.

Film 9 has a first in-plane axis 18, a second in-plane axis 20 and a third axis 22. In FIG. 1, the first in-plane axis 18 is substantially parallel to the length of the geometric feature 15. In FIG. 1, the first in-plane axis is normal to the end of film 9. These three axes are mutually orthogonal with respect to one another.

Various methods can be used to make a uniaxially oriented film. Uniaxial orientation may be measured by determining the difference in the index of refraction of the film along the first in-plane axis ($n_1$), the index of refraction along the second in-plane axis ($n_1$), and the index of refraction along the third axis ($n_2$). Uniaxially oriented films made by the method can have $n_1 \neq n_2$ and $n_1 \neq n_3$. Additionally, $n_2$ and $n_3$ are substantially the same as one another relative to their differences to $n_1$.

A method may also be used to provide a film that has a relative birefringence for a wavelength of interest of 0.3 or less. In another embodiment, the relative birefringence is less than 0.2 and in yet another embodiment it is less than 0.1. Relative birefringence is an absolute value determined according to the following expression:

$$|n_2-n_3|/|n_1-(n_2+n_3)/2|$$

A method can be used to make films that have at least one prismatic or lenticular geometric feature. The geometric feature may be an elongate structure that is typically parallel to the first in-plane axis of the film. As shown in FIG. 1, the structured surface comprises a series of right angle prisms 15. However, other geometric features and combinations thereof may be used. See, for example, FIGS. 2A-2E and FIGS. 3A-3W. FIG. 2A shows that the geometric features do not need to touch each other at their bases. FIG. 2B shows that the geometric features may have rounded peaks and curved facets. FIG. 2C shows that the peaks of the geometric features may be flat. FIG. 2D shows that opposing surfaces of the film each may have a structured surface. FIG. 2E shows that the geometric features may have varying land thicknesses, peak heights, and base widths.

FIGS. 3A-3W illustrate other cross-section shapes that may be used to provide the structured surface. These FIGS. further illustrate that the geometric feature may comprise a depression (See FIGS. 3A-I and 3T) or a projection (see FIGS. 3J-3S and 3U-W). In the case of features that comprise depressions, the elevated area between depressions may be considered to be a projection-type feature as shown in FIG. 2C.

Various methods may be used to provide various feature embodiments that may be combined in any manner so as to achieve a desired result. For example horizontal surfaces may separate features that have radiused or flat peaks. Moreover curved faces may be used on any of these features.

As can be seen from the Figures, the methods may be used to provide features of any desired geometric shape. They may be symmetric or asymmetric with respect to the z-axis (thickness) of the film. They may comprise a single feature, a plurality of the same feature in a desired pattern, or a combination of two or more features arranged in a desired pattern. Additionally, the dimensions, such as height and/or width, of the features may be the same across the structured surface. Alternatively, they may vary from feature to feature.

One process of making a structured article includes providing a polymeric resin that is capable of having a desired structured surface imparted to it by embossing, casting, extrusion or other non-machining techniques, which involve no cutting or other shaping of a solid material; rather, a flow mechanism of a fluid or visco-elastic material is shaped through the process then fixed into a solid. The structured surface may either be provided concurrently with the formation of the desired article or it may be imparted to a first surface of the resin after the article has been formed. The process will be further explained with regard to FIG. 4.

Figure 4:
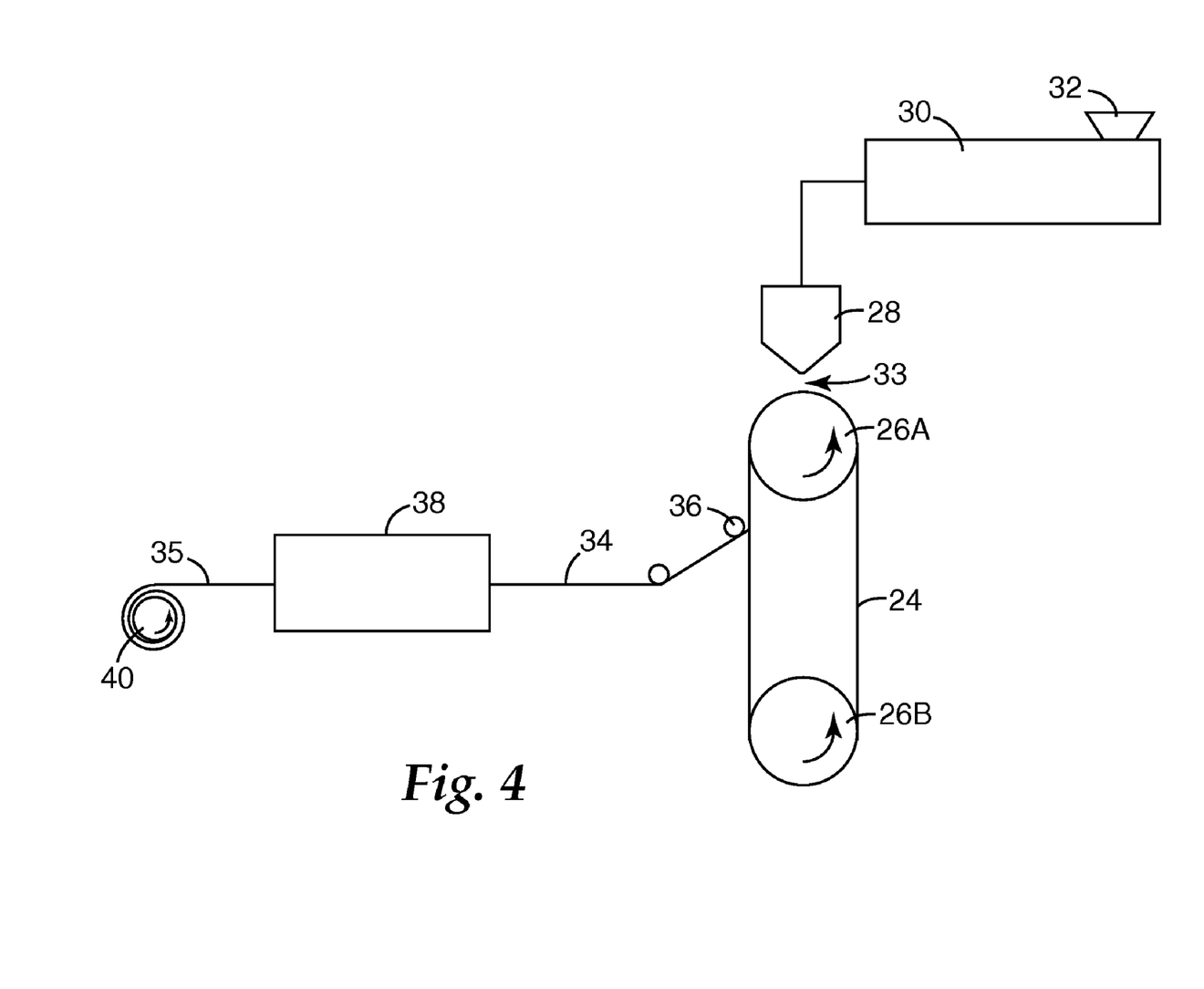
FIG. 4 is a schematic representation of one process for making a structured film.

FIG. 4 is a schematic representation of one method of making a film with a structured surface. In the method, a tool 24 comprising a negative version of the desired structured surface of the film is provided and is advanced by means of drive rolls 26A and 26B past an orifice (not shown) of die 28. Die 28 comprises the discharge point of a melt train, here comprising an extruder 30 having a feed hopper 32 for receiving dry polymeric resin in the form of pellets, powder, etc. Molten resin exits die 28 onto tool 24. A gap 33 is provided between die 28 and tool 24. The molten resin contacts the tool 24 and hardens to form a polymeric film 34. The leading edge of the film 34 is then stripped from the tool 24 at stripper roll 36. Subsequently, film 34 may be directed to stretching apparatus 38 if desired at this point. The film 34 may then be wound into a continuous roll at station 40.

A variety of techniques may be used to impart a structured surface to the film. These include batch and continuous techniques. They involve providing a tool having a surface that is a negative of the desired structured surface; contacting at least one surface of the polymeric film to the tool for a time and under conditions sufficient to create a positive version of the desired structured surface to the polymer; and removing the polymer with the structured surface from the tool. Typically the negative surface of the tool comprises a metallic surface, frequently with a release agent applied.

Although the die 28 and tool 24 are depicted in a vertical arrangement with respect to one another, horizontal or other arrangements may also be employed. Regardless of the particular arrangement, the die 28 provides the molten resin to the tool 24 at the gap 33.

The die 28 is mounted in a manner that permits it to be moved toward the tool 24. This allows one to adjust the gap 33 to a desired spacing. The size of the gap 33 is a function of the composition of the molten resin, its viscosity and the pressure necessary to essentially completely fill the tool with the molten resin.

The molten resin is of a viscosity such that it substantially fills, optionally with applied vacuum, pressure, temperature, ultrasonic vibration or mechanical means, into the cavities of the tool 24. When the resin substantially fills the cavities of the tool 24, the resulting structured surface of the film is said to be replicated.

In the case that the resin is a thermoplastic resin, it is typically supplied as a solid to the feed hopper 32. Sufficient heat is provided by the extruder 30 to convert the solid resin to a molten mass. The tool is typically heated by passing it over a heated drive roll 26A. Drive roll 26A may be heated by, for example circulating hot oil through it or by inductively heating it. The temperature of the tool 24 at roll 26A is typically above the softening point of the resin but below its decomposition temperature.

In the case of a polymerizable resin, including a partially polymerized resin, the resin may be poured or pumped directly into a dispenser that feeds the die 28. If the resin is a reactive resin, the method can include one or more additional steps of curing the resin. For example, the resin may be cured by exposure to a suitable radiant energy source such as actinic radiation, for example ultraviolet light, infrared radiation, electron beam radiation, visible light, etc., for a time sufficient to harden the resin and remove it from the tool 24.

The molten film can be cooled by a variety of methods to harden the film for further processing. These methods include spraying water onto the extruded resin, contacting the unstructured surface of the tool with cooling rolls, or direct impingement of the film and/or tool with air.

The previous discussion was focused on the simultaneous formation of the film and the structured surface. Another useful technique comprises contacting a tool to the first surface of a preformed film. Pressure, heat, or pressure and heat are then applied to the film/tool combination until the surface of the film has softened sufficiently to create the desired structured surface in the film. Preferably, the surface of the film is softened sufficiently to completely fill the cavities in the tool. Subsequently, the film is cooled and removed from the master.

As noted previously, the tool comprises a negative version (i.e., the negative surface) of the desired structured surface. Thus, it comprises projections and depressions (or cavities) in a predetermined pattern. The negative surface of the tool can be contacted with the resin so as to create the geometric features on the structured surface in any alignment with respect to the first or second in-plane axes. Thus, for example, the geometric features of FIG. 1 may be aligned with either the machine, or length, direction, or the transverse, or width, direction of the article.

In one embodiment of the replication step, the cavities of the tool are at least 50% filled by the resin. In another embodiment, the cavities are at least 75% filled by the resin. In yet another embodiment, the cavities are at least 90% filled by the resin. In still another embodiment, the cavities are at least 95% filled by the resin. In another embodiment, the cavities are at least 98% filled by the resin.

Adequate fidelity to the negative may be achieved for many applications when the cavities are filled to at least 75% by the resin. However, better fidelity to the negative is achieved when the cavities are filled to at least 90% by the resin. The best fidelity to the negative is achieved when the cavities are filled to at least 98% by the resin.

The tool used to create the desired structured surface may have a coating comprising a fluorochemical benzotriazole on the negative surface. The presence of the fluorochemical is preferred; some polymers do not require that the fluorochemical be used while others do. The fluorochemical benzotriazole preferably forms a substantially continuous monolayer film on the tool. The phrase "substantially continuous monolayer film" means that the individual molecules pack together as densely as their molecular structures allow. It is believed that the films self assemble in that the triazole groups of the molecules attach to available areas of the metal/metalloid surface of the tool and that the pendant fluorocarbon tails are aligned substantially towards the external interface.

The effectiveness of a monolayer film and the degree to which a monolayer film is formed on a surface is generally dependent upon the strength of the bond between the compound and the particular metal or metalloid surface of the tool and the conditions under which the film-coated surface is used. For example, some metal or metalloid surfaces may require a highly tenacious monolayer film while other such surfaces require monolayer films having much lower bond strength. Useful metal and metalloid surfaces include any surface that will form a bond with compounds and preferably, form a monolayer or a substantially continuous monolayer film. Examples of suitable surfaces for forming said monolayer films include those comprising copper, nickel, chromium, zinc, silver, germanium, and alloys thereof.

The monolayer or substantially continuous monolayer film may be formed by contacting a surface with an amount of the fluorochemical benzotriazole sufficient to coat the entire surface. The compound may be dissolved in an appropriate solvent, the composition applied to the surface, and allowed to dry. Suitable solvents include ethyl acetate, 2-propanol, acetate, 2 propanol, acetone, water and mixtures thereof. Alternatively, the fluorochemical benzotriazole may be deposited onto a surface from the vapor phase. Any excess compound may be removed by rinsing the substrate with solvent and/or through use of the treated substrate.

The fluorochemical benzotriazoles not only have been found to chemically bond to metal and metalloid surfaces, they also provide, for example, release and/or corrosion inhibiting characteristics to those surfaces. These compounds are characterized as having a head group that can bond to a metallic or metalloid surface (such as a master tool) and a tail portion that is suitably different in polarity and/or functionality from a material to be released. These compounds form durable, self-assembled films that are monolayers or substantially monolayers. The fluorochemical benzotriazoles include those having the formula:

wherein $R_f$ is $C_nF_{2n+1}$—$(CH_2)_m$—, wherein n is an integer from 1 to 22 and m is 0, or an integer from 1 to 22 X is —$CO_2$—, —$SO_3$—, —CONH—, —O—, —S—, a covalent bond, —$SO_2NR$—, or —NR—, wherein R is H or $C_1$ to $C_5$ alkylene; Y is —$CH_2$— wherein z is 0 or 1; and R' is H, lower alkyl or $R_f$—X—$Y_z$— with the provisos that when X is —S—, or —O—, m is 0, and z is 0, n is ≧7 and when X is a covalent bond, m or z is at least 1. Preferably n+m is equal to an integer from 8 to 20.

A particularly useful class of fluorochemical benzotriazole compositions for use as release agents comprising one or more compounds having the formula:

wherein $R_f$ is $C_nF_{2n+1}$—$(CH_2)_m$—, wherein n is 1 to 22, m is 0 or an integer from 1 to 22 X is —$CO_2$—, —$SO_3$—, —S—, —O—, —CONH—, a covalent bond, —$SO_2NR$—, or —NR—, wherein R is H or $C_1$ to $C_5$ alkylene, and q is 0 or 1; Y is $C_1$-$C_4$ alkylene, and z is 0 or 1; and R' is H, lower alkyl, or $R_f$—X—$Y_z$. Such materials are described in U.S. Pat. No. 6,376,065

One process may include a stretching step. For example, the article may either be uniaxially (including monoaxially) or biaxially oriented. Additionally, the process may optionally include a preconditioning step prior to stretching such as providing an oven or other apparatus. The preconditioning step may include a preheating zone and a heat soak zone. The process may also include a post conditioning step. For example, the film may be first heat set and subsequently quenched.

In general, polymers used in the articles or bodies may be crystalline, semi-crystalline, liquid crystalline or amorphous polymers or copolymers. It should be understood that in the polymer art it is generally recognized that polymers are typically not entirely crystalline, and therefore in the context of the articles or bodies, crystalline or semi-crystalline polymers refer to those polymers that are not amorphous and includes any of those materials commonly referred to as crystalline, partially crystalline, semi-crystalline, etc. Liquid crystalline polymers, sometimes also referred to as rigid-rod polymers, are understood in the art to possess some form of long-range ordering which differs from three-dimensional crystalline order.

For the articles or bodies, any polymer either melt-processable or curable into film form may be used, which can be particularly useful due to its manufacturing process, or the stability, durability, or flexibility of a final article. These may include, but are not limited to, homopolymers, copolymers, and oligomers that can be cured into polymers from the following families: polyesters (e.g., polyalkylene terephthalates (e.g., polyethylene terephthalate, polybutylene terephthalate, and poly-1,4-cyclohexanedimethylene terephthalate), polyethylene bibenzoate, polyalkylene naphthalates (e.g. polthylene naphthalate (PEN) and isomers thereof (e.g., 2,6-, 1,4-, 1,5-, 2,7-, and 2,3-PEN)) and polybutylene naphthalate (PBN) and isomers thereof), and liquid crystalline polyesters); polyarylates; polycarbonates (e.g., the polycarbonate of bisphenol A); polyamides (e.g. polyamide 6, polyamide 11, polyamide 12, polyamide 46, polyamide 66, polyamide 69, polyamide 610, and polyamide 612, aromatic polyamides and polyphthalamides); polyether-amides; polyamide-imides; polyimides (e.g., thermoplastic polyimides and polyacrylic imides); polyetherimides; polyolefins or polyalkylene polymers (e.g., polyethylenes, polypropylenes, polybutylenes, polyisobutylene, and poly(4-methyl)pentene); ionomers such as Surlyn™ (available from E.I. du Pont de Nemours & Co., Wilmington, Del.); polyvinylacetate; polyvinyl alcohol and ethylene-vinyl alcohol copolymers; polymethacrylates (e.g., polyisobutyl methacrylate, polypropylmethacrylate, polyethylmethacrylate, and polymethylmethacrylate); polyacrylates (e.g., polymethyl acrylate, polyethyl acrylate, and polybutyl acrylate); polyacrylonitrile; fluoropolymers (e.g., perfluoroalkoxy resins, polytetrafluoroethylene, polytrifluoroethylene, fluorinated ethylene-propylene copolymers, polyvinylidene fluoride, polyvinyl fluoride, polychlorotrifluoroethylene, polyethylene-co-trifluoroethylene, poly (ethylene-alt-chlorotrifluoroethylene), and THV™ (3M Co.)); chlorinated polymers (e.g., polyvinylidene chloride and polyvinylchloride); polyaryether ketones (e.g., polyetheretherketone ("PEEK")); aliphatic polyketones (e.g., the copolymers and terpolymers of ethylene and/or propylene with carbon dioxide); polystyrenes of any tacticity (e.g., atactic polystyrene, isotactic polystyrene and syndiotactic polystyrene) and ring- or chain-substituted polystyrenes of any tacticity (e.g., syndiotactic poly-alpha-methyl styrene, and syndiotactic polydichlorostyrene); copolymers and blends of any of these styrenics (e.g., styrene-butadiene copolymers, styrene-acrylonitrile copolymers, and acrylonitrile-butadiene-styrene terpolymers); vinyl naphthalenes; polyethers (e.g., polyphenylene oxide, poly(dimethylphenylene oxide), polyethylene oxide and polyoxymethylene); cellulosics (e.g., ethyl cellulose, cellulose acetate, cellulose propionate, cellulose acetate butyrate, and cellulose nitrate); sulfur-containing polymers (e.g., polyphenylene sulfide, polysulfones, polyarylsulfones, and polyethersulfones); silicone resins; epoxy resins; elastomers (e.g., polybutadiene, polyisoprene, and neoprene), and polyurethanes. Blends or alloys of two or more polymers or copolymers may also be used.

It has been difficult to replicate surfaces using semicrystalline polymers, especially polyesters. Generally they adhere tenaciously to the tool during the replication process, unless treatments such as the fluorochemical benzotriazole coating described above are employed. As a result, they are difficult to remove from an untreated tool without causing damage to the replicated surface. Examples of semicrystalline thermoplastic polymers useful in the articles or bodies include semicrystalline polyesters. These materials include polyethylene terephthalate or polyethylene naphthalate. Polymers comprising polyethylene terephthalate or polyethylene naphthalate are found to have many desirable properties.

Suitable monomers and comonomers for use in polyesters may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Other aliphatic, aromatic, cycloalkane or cycloalkene dicarboxylic acids may be used. Alternatively, esters of any of these dicarboxylic acid monomers, such as dimethyl terephthalate, may be used in place of or in combination with the dicarboxylic acids themselves.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethylpropyl-3-hydroxy-2,2-di methyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols. Other aliphatic, aromatic, cycloalkyl and cycloalkenyl diols may be used.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Suitable polyester copolymers include copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof, (b) isophthalic acid, or esters thereof, (c) phthalic acid, or esters thereof, (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), and copolymers of polyalkylene terephthalates (copolymers of terephthalic acid, or esters thereof, with (a) naphthalene dicarboxylic acid, or esters thereof, (b) isophthalic acid, or esters thereof, (c) phthalic acid, or esters thereof, (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)). The copolyesters described may also be a blend of pellets where at least one component is a polymer based on one polyester and other component or components are other polyesters or polycarbonates, either homopolymers or copolymers.

In some embodiments of this invention, a particularly useful polymer is the product of extrusion of a polyester and a polycarbonate. It is widely believed that when polymers chosen from these two classes are extruded together, some transesterification takes place, but that transesterification is slow and unlikely to go to completion during extrusion, which would result in a truly random copolymer. Thus, polyester-polycarbonate extrusion can result in an extrudate which can range along a continuum from a two-component polymer blend to a homogeneous copolymer, but most typically results in an extrudate that has both some block copolymer character and some polymer blend character.

LED Color Mixing

Color mixing of light from LEDs, or any other type of point light source, is achieved in a compressed space by use of a birefringent microstructured optical film, such as one or more of those films described above, within a reflective cavity. Light rays are rapidly split into large numbers with a small amount of divergence, resulting from the nature of light reflection, refraction, and/or diffraction in birefringent materials. When refraction occurs, typically each light ray that enters the birefringent film splits into two upon entering the film. With appropriate selection of materials and structures, high density mixing of light signals within various ranges of wavelengths can be achieved to produce substantially spatial uniformity of color or light intensity. A possible advantage is thinner backlight cavities or smaller color mixing zones. When used as part of a backlight cavity, a prismatic structured birefringent film may facilitate better beam spreading and color mixing, while avoiding the losses that are inherent in highly scattering systems. The size of the apex angle, shape of the prismatic structures, and level of birefringence can be varied to achieve tradeoffs between mixing and reflective losses. For example, when used as part of a recycling backlight cavity, such as for an LCD device, a very shallow angle structured birefringent film can facilitate better beam spreading and color mixing, while minimizing losses. The films can be combined with other types of optical films. In addition, an index matching material can be applied to the structured surface causing the resulting surface to be essentially planar. Alternatively, materials of non-matching index can be applied to achieve a variety of optical effects.

Figure 5:
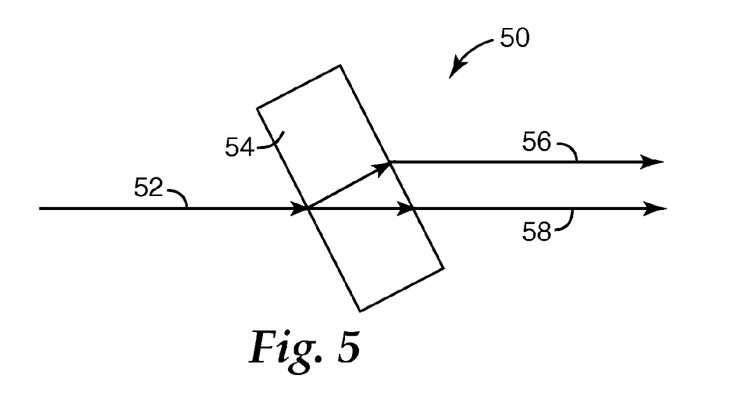
FIG. 5 is a diagram illustrating ray splitting as light passes through a single layer of a birefringent film.

FIG. 5 illustrates an example of ray splitting 50 as unpolarized light 52 passes through a single layer of a birefringent film 54, resulting in beams 56 (p-pol) and 58 (s-pol). This type of film can be implemented, for example, as an oriented polycarbonate/polyester blend. By reflecting back and forth in a cavity, for example between an Advanced Polarizing Film™ (APF) (3M Company, St. Paul, Minn.) and a high efficiency specular reflector, light can be rapidly spread and mixed, while maintaining some directional control, resulting in sufficient light among the visible wavelengths to function as a backlight, for example. Surface textures, microstructures and diffractive elements can help to enhance this effect.

Figure 6:
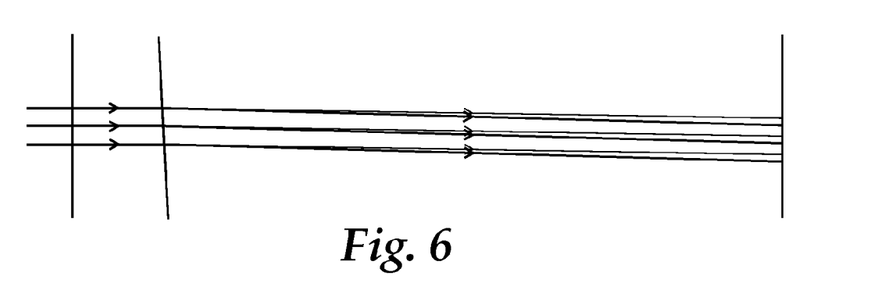
FIG. 6 is a diagram illustrating ray splitting through a birefringent film with a three degree prism angle off horizontal.
Figure 7:
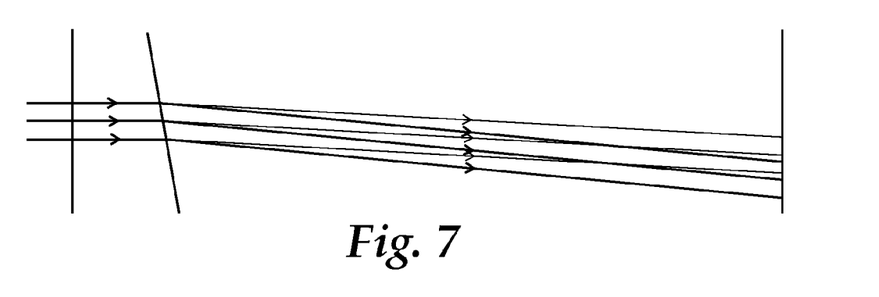
FIG. 7 is a diagram illustrating ray splitting through a birefringent film with a ten degree prism angle off horizontal.

When microstructures are used in the film, even greater beam spread can be achieved. For example, a three degree prism angle off horizontal results in the beam spread illustrated in FIG. 6, and a ten degree prism angle off horizontal results in the beam spread illustrated in FIG. 7. Any diffractive effects due to the microstructures have the effect of further multiplying the beam spread.

The spreading of the light through a transmitting anisotropic structured film can vary in extent with polarization state, for example as measured along various polarization directions with a post film transmission analyzer such as a absorptive polarizing film. The light spreading can vary among given directions relative to the principal in-plane axes of refractive index, for example. The relative spreading among wavelengths can be in part controlled by the dispersive (wavelength sensitive) characteristics of the anisotropic principal refractive indices. The spreading can also vary along different structural directions, for example along or across a groove direction or an elongated structural direction. For example, when the linear density of discrete light sources (e.g., discrete LED bulbs) varies with direction in a two-dimensional, for example planar, array or backlight, the alignment of the grooves of the anisotropic structured film can be adjusted to optimize the light spreading. For example, an embodiment can maximize the spreading along the direction of lowest linear light source density. The shapes of the structures on the birefringent film can be essentially elongate with nearly constant or variable cross-sections as one moves across or along the structural array. In some cases, the variations can be essentially one-dimensional, for example the height of a structure from the film land is essentially constant except for a minority of deviations, along one direction. Alternatively, the structures can vary significantly in both directions of the film plane, for example the height of a structure from the film land varies along both in-plane directions, a two-dimensional structural variation. The structural array can comprise a regular, periodic, or aperiodic collection of surface features. The structures can provide for light spreading through a variety of optical mechanisms including refractive, diffractive, and scattering mechanisms. The size of the structures can include derived features such that the spacing or pitch may be adjusted and optimized. Finally, the sidedness of the structures can be arranged relative to the source, for example with the structured side pointing towards ("points down") or away ("points up") from the source. Alternatively, films with similar or different structures on both sides of the film may be used. Thus, both the structural shapes and inherent material refractive index anisotropy, as well as their relative orientations or juxtapositions, can be used to alter and control the spreading of light and the mixing of colors in a back light cavity.

A wide variety of polymeric inherently birefringent materials can be used. In order to improve lifetimes, materials with low absorption are desired. Likewise, thinner films may be preferred to reduce color changes without the need for balancing with backlight source configurations. Polyesters with low absorption in the visible, such as PET and its copolymers, are particularly useful as are various polycarbonates and their co-polymers.

The films can also be combined with any of a number of other films to enhance spreading, color mixing, or for other purposes. Combining two or more films with similar or different structures can be used. The relative orientation of the structures may be varied. In the case of elongate structures, for example structures with prismatic cross-sections propagating continuously in one direction, one class of configurations crosses the elongate axes of the two films structures at right angles. The films can vary individually in the placement of their structural points up or down relative to the source. Birefringent structured films can be combined with isotropic structured films in any of these ways. Birefringent structured films can also be combined with films of different or complementary function. For example, they may be combined with multilayer optical films that function as reflective polarizers or brightness enhancement films. They can also be combined with a retarder, a wave plate, an IR filter, a circular polarizer, or a partial mirror surface.

Light spreading is dependent on the polarization state of light from the source. The spreading characteristics for given polarization states can be tuned, for example, to match a given LCD display and its alignment. The tuning can be accomplished, for example, by design of structure geometry or control of the level of birefringence.

The light spreading capability of the films can be probed by a variety of ways. One such method comprises a test bed with discrete, spatially separated light sources and a digital camera as the analyzer. Systems can be analyzed with a variety of f-stop numbers and with different distances between the test bed and the camera. Any given film is interposed between the source and analyzer and the resulting uniformity of intensity measured. Relative comparison can be made between the resulting picture and a reference made without the film interposing.

Additional elements can be added to better understand the effects within the context of a specific application. For example, in the case of backlights for LCD illumination, a backlight cavity can be used which essentially encloses the light sources. The light sources may be chosen for a specific purpose, for example LEDs for LED lighting applications. A specific type of source within a given class may be chosen, for example side or front emitting LEDs. In general, the relative effectiveness of the films may depend upon the particular application and configuration chosen. To enhance light recycling, a reflective backing can be used on the bulb plane. Reflective material may also line the walls of the light mixing cavity. To simulate the acceptance and transmission of the light through an LCD array, a diffuser plate can be mounted at the top of the cavity. A diffuser plate can also be included as a film component in the mixing cavity. A variety of diffusing plates may be used including, for example, isotropic or asymmetric diffusers, as well as preferentially forward or backward scattering diffusers.

Various aspects of the desired system configuration can be used to control or enhance the performance of the films for light spreading and/or color mixing. For example, the distance of the bulbs to the film, and also from the film to a final diffuser plate or to the LCD itself, can be varied. In other cases, distances that optimize the mixing and spreading can be found. The spacing and arrangement of the bulbs on the two-dimensional backplane can be adjusted. Optimum distances may be related to these considerations.

A variety of metrics can be developed to describe spatial uniformity for various quantities, including those using red, green, and blue relative grayscale intensities; color coordinates (e.g., x,y 1931 or u,v 1976 coordinates); color temperature; and luminance. Besides uniformity, total and color-specific intensity can be measured. It is often desired to not only optimize uniformity and color mixing but total light throughput and color balance as well.

In the above description, the position of elements has sometimes been described in terms of "first", "second", "third", "top" and "bottom". These terms have been used merely to simplify the description of the various elements of the invention, such as those illustrated in the drawings. They should not be understood to place any limitations on the useful orientation of the elements of the present invention. Also, as an alternative to the use of axes, the positioning of a single article, or of multiple articles used together, can be described in terms of their Euler angles.

Accordingly, the present invention should not be considered limited to the particular examples described herein, but rather should be understood to cover all aspects of the invention as fairly set out in the claims. Various modifications, equivalents, as well as numerous structures to which the present invention may be applicable will be readily apparent to those of skill in the art to which the present invention is directed upon review of the present specification. The claims are intended to cover such modifications and devices.

EXAMPLES

The following describes a specific method for the Examples. A rectangular test bed cavity using a row of Lumiled (San Jose, Calif.) side-emitting LEDs was constructed. Green, red, and blue bulbs were arranged in a repeating pattern. A reflective surface was provided on the backplane and side walls. The top was covered by a 2 mm thick cast acrylic diffuser plate from Astra Products, Baldwin, N.Y. The diffuser exhibited essentially 100% haze and a clarity of 3.6 as measured using a Haze Gard available from BYK-Gardner U.S.A located in Columbia, Md. The cavity height (the distance from the reflective back surface to the bottom of the diffuser plate) was 29 mm. The LED bulbs were 3 mm tall. The test films were mounted on an acrylic plate (available from Excel Plastic Products, Byron Center, Mich., Cyro type, Acrylite FF. 0.098" thick). This acrylic plate was mounted between the LEDs on the reflective back surface and the diffuser plate on the top of the cavity. The distance from the reflective back surface to the bottom of the acrylic mounting plate was 12 mm. Data were captured using red, green, and blue color filters with a ProMetric PM-1421-1 Imaging Colorimeter made by Radiant Imaging Inc. (Duval Wash.). The testing system was placed about 0.5 meter from the camera with the f-stop number set at 16. The image was focused using a sharp pen tip placed over the top of the test bed and the auto exposure function was used. The resulting color images were compared to the reference case without the test film mounted using visual perception as well as gray scale intensity variations for each respective color.

Measurements of the refractive indices at 632.8 nanometers (nm) were taken on the backside of the film using a Metricon prism coupler available from Metricon (Piscataway, N.J.). In general, the three principal indices of refraction were taken to be generally representative of the refractive index in the structures (in this case, triangular prisms) for linearly polarized light, polarized along the prism propagator (referred to as the x direction), across the prism cross section (referred to as the y direction), and in the thickness direction (referred to as the z direction).

Example 1

A structured oriented PET film was made in accordance with the general procedures of Examples 1-7 of U.S. patent application Ser. No. 11/184,027, entitled "Uniaxially Oriented Article Having a Structured Surface," and filed Dec. 23, 2004, which is incorporated herein by reference as if fully set forth. In this manner, a PET film with a surface comprising a covering array of elongate prismatic structures was formed with nearly truly uniaxial orientation and relatively flat prismatic faces. The cross-sectional shape of these prisms was approximately triangular. The triangle was approximately isosceles with a nearly right angle at the apex. The refractive indices were measured to be about 1.66, 1.55, and 1.55 in the x, y, and z directions, respectively.

In a first test, the film was mounted points down in the test bed so that the prism propagation (groove) direction aligned with the central row of bulbs and the resulting image was captured. When compared to the reference image, the film improved the color uniformity both along and across the test bed.

In a second test, a replicate film was mounted points down in the test bed so that the prism propagation (groove) direction was perpendicular to the central row of bulbs and the resulting image was captured. When compared to the reference image, the film improved the color uniformity both along and across the test bed. This alignment showed a further improvement over the previous alignment.

In other tests, films were also tested with points up, again with improved uniformity.

Example 2

The film of Example 1 was gripped across the prismatic structures so that the elongate axis spanned between the clips, while the perpendicular edges remained unconstrained, and heat treated (set) at 175° Celsius for two minutes.

The film was mounted points down in the test bed so that the prism propagation (groove) direction aligned with the central row of bulbs and the resulting image was captured. When compared to the reference image, the film improved the color uniformity both along and across the test bed, to an extent similar to the first test result of Example 1.

Example 3

The cast film of Example 1 was drawn in a weakly biaxial manner to overall stretch ratios of 5:1 and 5:2 for case 3a and 3b, respectively. The films were further heat set in the manner of Example 2. Case 3a represents the case of constrained uniaxial stretching in which the resulting film is not truly uniaxially drawn, for example as achieved through a conventional tentering process. For case 3a, the refractive indices were measured to be about 1.65, 1.56, and 1.56 in the x, y, and z directions, respectively. Case 3b represents the case of a weakly biaxially oriented film. For case 3b, the refractive indices were measured to be about 1.65, 1.58, and 1.54 in the x, y, and z directions, respectively.

The film was mounted points down in the test bed so that the prism propagation (groove) direction aligned with the central row of bulbs and the resulting image captured. When compared to the reference image, the film improved the color uniformity both along and across the test bed; however, case 3a exhibited better uniformity than case 3b and Examples 1 and 2 performed better than either of these cases.

In a related case, 3c, the film was drawn identically to case 3b but was not heat set. Again, the film was mounted points down in the test bed so that the prism propagation (groove) direction aligned with the central row of bulbs and the resulting image captured. When compared to the reference image, the film improved the color uniformity both along and across the test bed; however, like case 3b, cases 3a and Examples 1 and 2 performed better than either the along or across orientation of case 3c.

Example 4

A cast structured film was combined into a single construction with a cast precursor of a multilayer optical film and stretched to simultaneously form a weakly birefringent structured surface layer on a reflective polarizing film in accord with the general methods of Examples 1-8 of U.S. Provisional Patent Application Ser. No. 60/669,614, entitled "Structured Oriented Films for Use in Displays," and filed Apr. 8, 2005, which is incorporated herein by reference as if fully set forth. In this manner, the prismatic propagation direction was aligned with the block axis of the reflective polarizer.

The film was mounted points down in the test bed so that the prism propagation (groove) direction aligned with the central row of bulbs and the resulting image was captured. When compared to the reference image, the film improved the color uniformity both along and across the test bed.

Example 5

A cast structure with two-dimensional variation was formed on a PET, amorphous cat web in accordance with the general procedure of Examples 1-7 of U.S. patent application Ser. No. 11/184,027, entitled "Uniaxially Oriented Article Having a Structured Surface," and filed Dec. 23, 2004. The cast structure comprised a hexagonal array of three-sided pyramids. The cast structure was drawn in a truly uniaxial manner according to the general drawing method of Example 1 to about five times its initial length. In this manner, the three-sided pyramidal shapes were stretched out into elongated, three-sided wedges. The refractive indices were measured to be about 1.65, 1.58, and 1.54 in the x (elongate), y, and z directions, respectively.

The film was mounted points down in the test bed so that the elongated axis was aligned with the central row of bulbs and the resulting image was captured. When compared to the reference image, the film improved the color uniformity both along and across the test bed.

Example 6

A film of Example 1 was combined into a variety of crossed configurations with itself and with BEF 2 brightness enhancement film available from 3M Company, St. Paul Minn., U.S.A., as presented in Table 1.

TABLE 1

| Case | Film nearest source | Structure Alignment vs. bulbs | Structured side pointing | Film nearest camera | Structure Alignment vs. bulbs | Structured side pointing |
|------|---------------------|-------------------------------|--------------------------|---------------------|-------------------------------|--------------------------|
| 6a | example 1 | along | down | example 1 | across | down |
| 6b | example 1 | across | up | example 1 | along | up |
| 6c | example 1 | along | down | BEF2 | across | down |
| 6d | BEF 2 | across | up | example 1 | along | up |
| 6e | BEF 2 | along | down | example 1 | across | down |
| 6f | example 1 | across | up | BEF2 | along | up |

In each case, the film combinations were mounted in the test bed so that the elongated axis of the film closest to the source was aligned with the central row of bulbs and the resulting image captured. When compared to the reference image, the film improved the color uniformity both along and across the test bed. In each case the uniformity was better than the single film case of Example 1.

Table 1 provides only a few of the possible combinations. For example, a film with points up could be paired with a film with points down, or the first film could be across/down or along/up, or the second film could be across/up or along/down, etc.

Example 7

Figure 8:
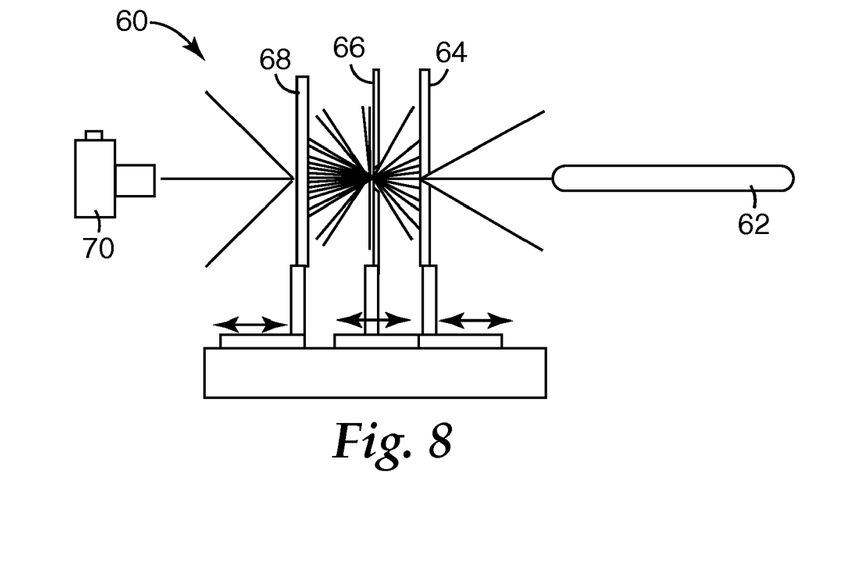
FIG. 8 is diagram illustrating a set-up for particular Examples.

As also illustrated in FIG. 8, Example 7 used the following experimental laser scatterometer reflectometer apparatus 60. A red helium neon laser 62 was directed through a Glan-Thompson polarizer and a matched half wave plate. The half wave plate was used to rotate polarization such that the polarization is vertical or horizontal. The beam was then directed through a 1 mm via in a first surface mirror 64 where the first surface mirror is directed away from the laser 62.

The film to be tested was mounted in a hole in a Lambertian screen 66. The laser light was then directed onto the film to be tested. Grooved microstructured films were oriented vertically, such that the grooves ran up and down. For the cases in which the films were crossed one film was vertically oriented and the other film was horizontally oriented. The laser light transmitted through the film was projected onto a partially transmissive Lambertian white screen 68. The projection distance was 6 inches.

To measure the reflected image, the transmission screen 68 was removed and the camera 70 relocated to maintain a half meter spacing. The distance between the reflection display screen 66 and the first surface mirror 64 was 3 inches, such that the reflection travel path and transmission travel path were of the same length. A small light absorber was placed in the optical path to prevent the transmitted light from entering the camera 70.

A comparison of a single layer of 3M BEF 90/24 and a birefringent version of the same film (oriented polyester with nominal 22 micron pitch and nominal 90° enclosed angles) showed the following results. With the structure oriented toward the laser source, the 3M BEF 90/24 splits the laser light into two separate beams with very little diffraction in between. Additionally, the split is polarization insensitive. On the other hand, the birefringent BEF distributes the light over a much broader area and is polarization sensitive. The horizontal polarization does not split the light as much as the vertical polarization, and this is consistent with the birefringence of the film, since the film had been oriented along the grooves. This demonstrates the utility of birefringent structures for enhanced spreading of light from point sources—for example, mixing of the light from LEDs of different colors to provide a more spatially uniform backlight.

Example 8

Example 8 used the same experimental set up as described in Example 7 and shown in FIG. 8. For the case in which the BEF was crossed, the following results were seen. For the commercial BEF the light is largely concentrated in the four corners of the film with only a very small amount of light spread between the corners. For the birefringent BEF the light is spread between the corners much more efficiently and even reached rather uniformly through the center. Although more light is seen in the corners than through the centers of the birefringent BEF, even the corners were more spread out than for the non-birefringent case. This again demonstrates the utility of birefringent structures for enhanced spreading of light from point sources—for example, mixing of the light from LEDs of different colors to provide a more spatially uniform backlight.

Example 9

Example 9 used the same experimental set up as described in Example 7 and shown in FIG. 8. In this Example, the film used was had crossed BEF structures away from the source.

As commercial BEF is retroreflective, it returns most of the light to the source and the light that leaks out is concentrated in the center. The birefringent BEF showed substantial light spreading due to a combination of birefringence with the optics of the film. It was seen to be polarization sensitive and produces a rather uniform square-like output.

FIGS. 9-14 are photos illustrating in gray scale color mixing for Examples 7-9. The photos were taken using a Konica Minolta A2 camera in full manual mode (ISO 100 equivalent) using a HeNe red laser. The photos were processed in the Adobe Photoshop program using the following sequence in order to transform the images to their inverse: import photo, correct for geometric lens distortion, convert to gray scale, invert image, apply autolevel, and then save the file. Consequently, the brightest regions of the image now appear dark creating a white background. In these negative images, the degree of light spreading is represented by the range covered by black dots, with greater density of black dots and therefore blacker areas representing regions of greater intensity. All photos shown in FIGS. 9-12 were taken in transmission mode. The polarization used was either vertical (aligned with the first structure direction), horizontal (orthogonal to the first structure direction), or circular (balanced both polarizations).

Figure 9:
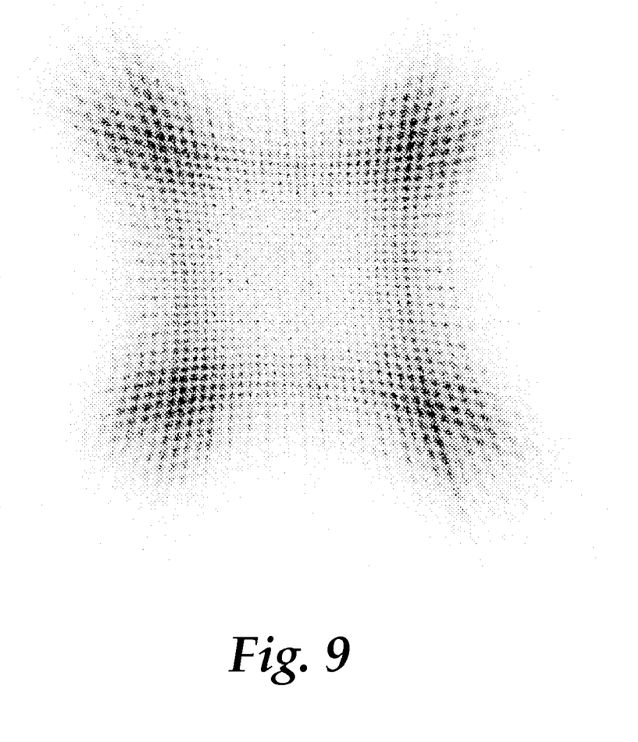
FIGS. 9-14 are photos illustrating in gray scale color mixing for particular Examples.

FIG. 9 is a photo showing light spreading from two birefringent microstructured films having a 22 micron pitch, crossed at 90 degrees, and including angle prisms, structures facing in towards light source. The light source was circularly polarized. This image is a superposition of the vertical and horizontal polarizations of images in FIGS. 10 and 11.

Figure 10:
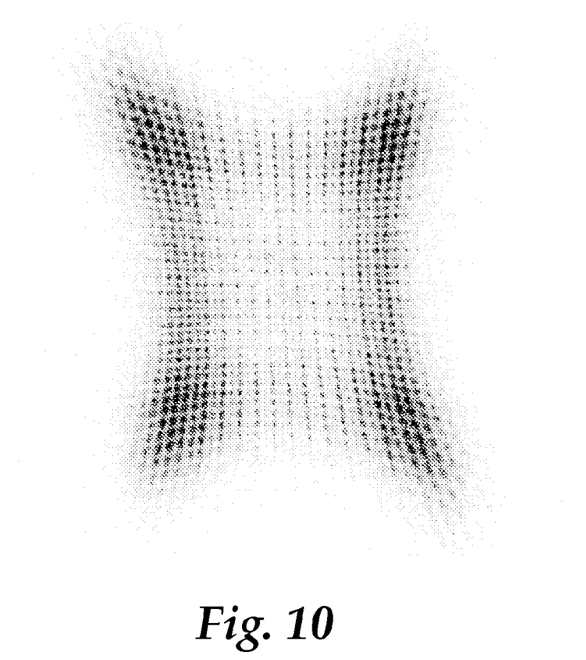

FIG. 10 is a photo showing light spreading from two birefringent microstructured films having a 22 micron pitch, crossed at 90 degrees, and including angle prisms, structures facing in towards light source. The light source was horizontally polarized. This image demonstrates the horizontal polarization component of the image in FIG. 11.

Figure 11:
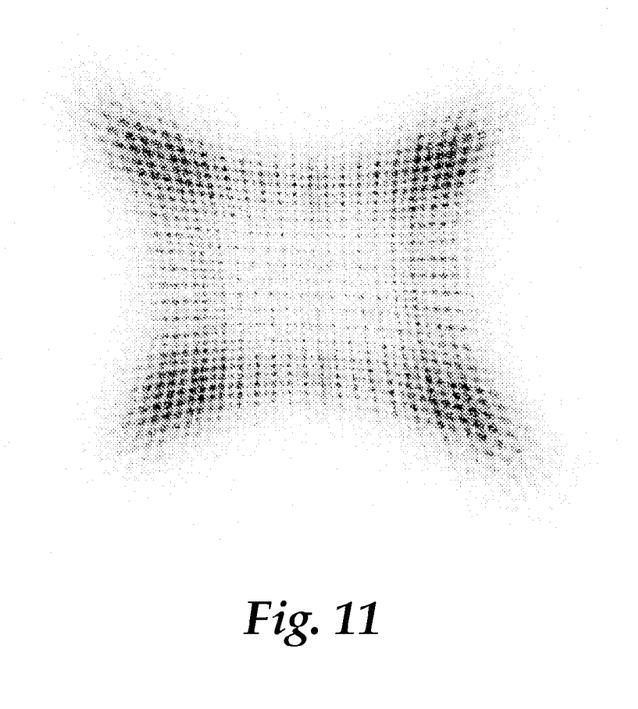

FIG. 11 is a photo showing light spreading from two birefringent microstructured films having a 22 micron pitch, crossed at 90 degrees, and including angle prisms, structures facing in towards light source. The light source was vertically polarized.

Figure 12:
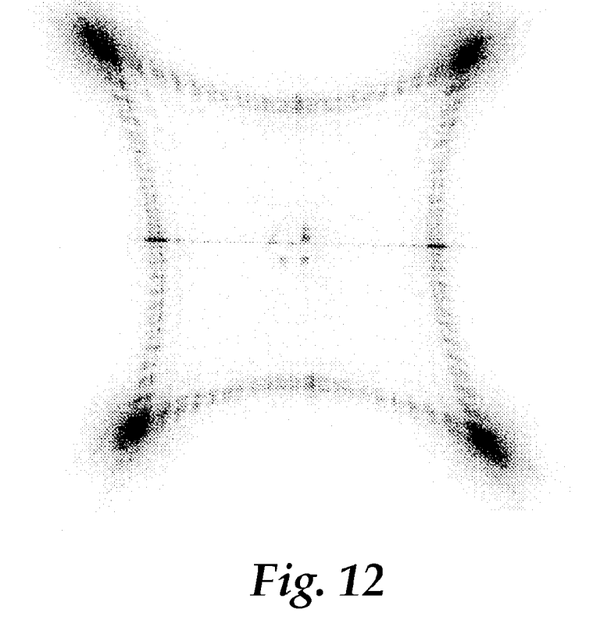

FIG. 12 is a photo showing light spreading from two isotropic microstructured films having a 24 micron pitch, crossed at 90 degrees, and including angle prisms, structures facing in towards light source. The light source was circularly polarized. This image was unchanged when the light source was changed to vertically polarized light or horizontally polarized light.

Figure 13:
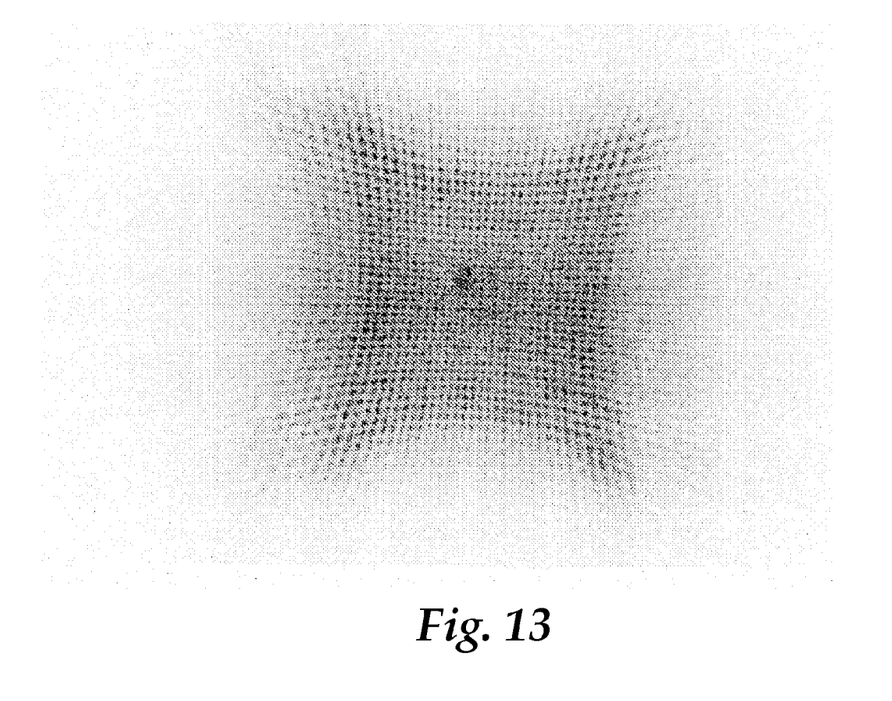

FIG. 13 is a photo showing light spreading from two birefringent microstructured films having a 22 micron pitch, crossed at 90 degrees, and including angle prisms, structures facing out away from the light source. The light source was circularly polarized.

Figure 14:
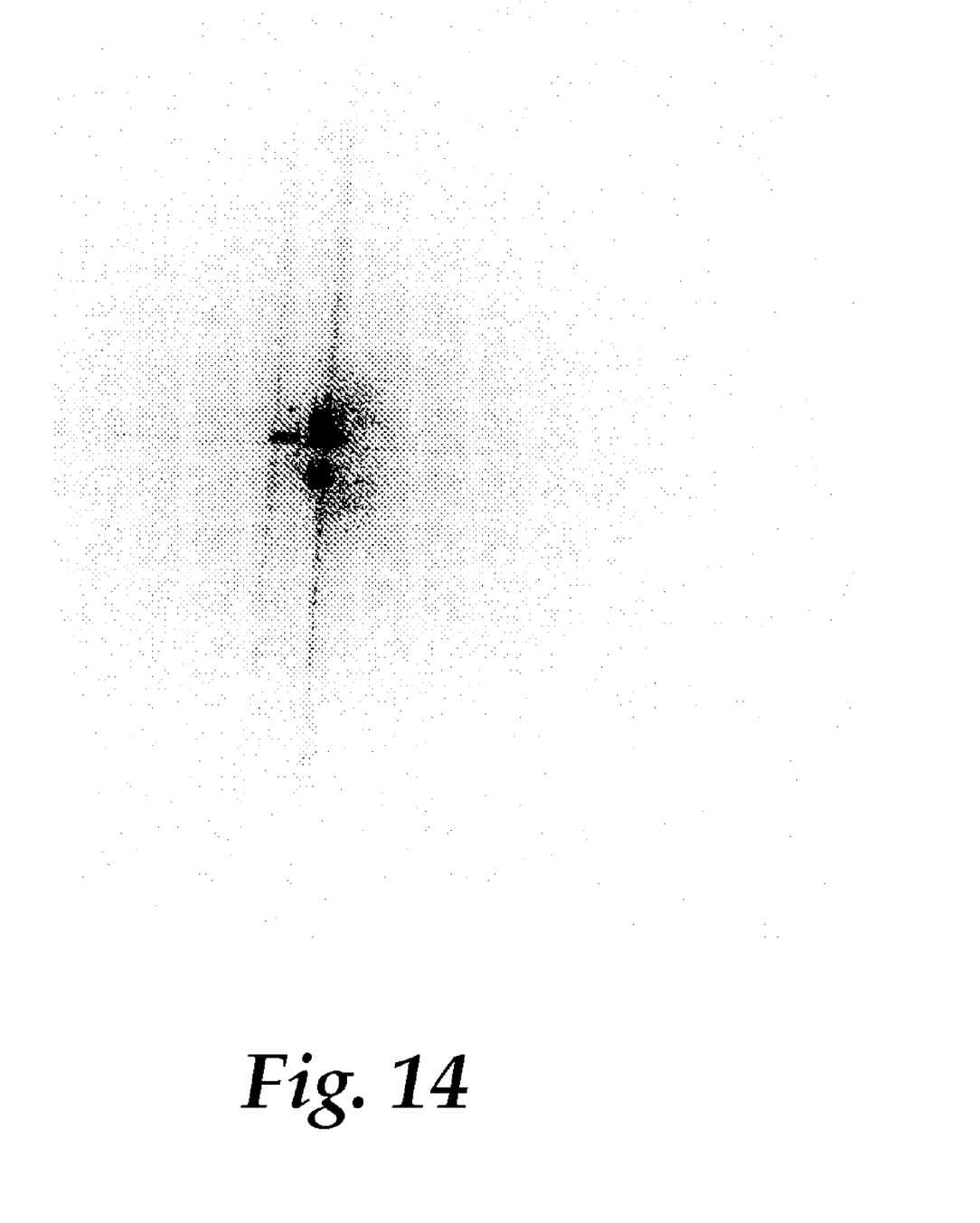

FIG. 14 is a photo showing light spreading from two isotropic microstructured films having a 24 micron pitch, crossed at 90 degrees, and including angle prisms, structures facing out away from light source. The light source was circularly polarized. This image was unchanged when the light source was changed to vertically polarized light or horizontally polarized light.

As shown in FIGS. 9-12, the birefringent films, corresponding with the photos in FIGS. 9-11, spread the light better in the four corners and also dispersed the light more generally than the isotropic film, corresponding with the photo in FIG. 12. As shown in FIGS. 13 and 14, the birefringent film, corresponding with the photo in FIG. 13, dispersed the light more uniformly and more broadly than the isotropic film, corresponding with the photo in FIG. 14.

The invention claimed is:

1. An article for use in light spreading, comprising:
    (a) a body having (i) first and second surfaces, and (ii) first and second in-plane axes that are orthogonal with respect to each other and a third axis that is mutually orthogonal to the first and second in-plane axes in a thickness direction of the body; and
    (b) a portion of the first surface being a birefringent structured surface,
    wherein the portion is structured such that, when the article receives light signals from a plurality of point light sources each emitting light within a particular range of wavelengths, the structured surface causes splitting of the light signals into a plurality of divergent light signals producing a substantially uniform color light signal,
        wherein the structured surface causes a divergence of at least three degrees among the plurality of light signals.

2. The article of claim 1 wherein the structured surface causes a divergence of at least ten degrees among the plurality of light signals.

3. A method of making an article for use in light spreading, comprising the steps of:
    (a) providing a body having (i) first and second surfaces, and (ii) first and second in-plane axes that are orthogonal with respect to each other and a third axis that is mutually orthogonal to the first and second in-plane axes in a thickness direction of the body; and
    (b) forming a birefringent structured surface on a portion of the first surface,
    wherein the portion is structured such that, when the article receives light signals from a plurality of point light sources each emitting light within a particular range of wavelengths, the structured surface causes splitting of the light signals into a plurality of divergent light signals producing a substantially uniform color light signal,
        further including causing a divergence of at least three degrees among the plurality of light signals.

4. The method of claim 3, further including causing a divergence of at least ten degrees among the plurality of light signals.

5. An article for use in light spreading, comprising:
    (a) a body having (i) first and second surfaces, and (ii) first and second in-plane axes that are orthogonal with respect to each other and a third axis that is mutually orthogonal to the first and second in-plane axes in a thickness direction of the body; and
    (b) a portion of the first surface being a birefringent structured surface, wherein the portion is structured such that, when the article receives a plurality of light signals each within a distinct range of wavelengths, the structured surface causes splitting the light signal into a plurality of divergent light signals among the wavelengths,
    wherein the portion is structured such that, when the article receives a first light signal within a first range of wavelengths, a second light signal within a second range of wavelengths different from the first range, and a third light signal within a third range of wavelengths different from the first and second ranges, the structured surface causes splitting of the first, second, and third signals to produce a substantially uniform color light signal.

6. The article of claim 5, wherein the portion is structured such that, when the article receives red, green, and blue light signals, the structured surface causes splitting of the red, green, and blue light signals to produce a substantially white light signal.

* * * * *